United States Patent
Johansson

[11] Patent Number: 5,946,612
[45] Date of Patent: Aug. 31, 1999

[54] METHOD AND APPARATUS FOR PERFORMING LOCAL TRAFFIC MEASUREMENTS IN A CELLULAR TELEPHONE NETWORK

[75] Inventor: Åke Johansson, Sollentuna, Sweden

[73] Assignee: Telefonaktiebolaget L M Ericsson (publ), Stockholm, Sweden

[21] Appl. No.: 08/828,412

[22] Filed: Mar. 28, 1997

[51] Int. Cl.$^6$ .............................. H04M 15/00; H04Q 7/20
[52] U.S. Cl. ........................... 455/405; 455/446; 455/449
[58] Field of Search ................................... 455/405, 67.1, 455/453, 442, 436, 437, 438, 439, 440, 433, 434, 450, 515, 446–449, 67.4, 423; 379/113, 133–138

[56] References Cited

U.S. PATENT DOCUMENTS

| | | | |
|---|---|---|---|
| 4,670,899 | 6/1987 | Brody et al. | 455/453 |
| 5,243,598 | 9/1993 | Lee | 370/332 |
| 5,267,262 | 11/1993 | Wheatley, III | 375/200 |
| 5,465,390 | 11/1995 | Cohen | 455/446 |
| 5,507,007 | 4/1996 | Gunmar et al. | 455/447 |
| 5,613,217 | 3/1997 | Hagstrom et al. | 455/67.1 |
| 5,649,000 | 7/1997 | Lee et al. | 455/436 |
| 5,666,656 | 9/1997 | Rautiola | 455/513 |
| 5,697,053 | 12/1997 | Hanly | 375/200 |
| 5,787,350 | 7/1998 | Van Der Vorm et al. | 455/446 |
| 5,828,962 | 10/1998 | Ho-A-Chuck | 455/446 |

FOREIGN PATENT DOCUMENTS

| | | |
|---|---|---|
| 0 431 956 | 12/1990 | European Pat. Off. |
| 0 752 766 | 1/1996 | European Pat. Off. |
| WO 94/06222 | 3/1994 | WIPO |
| WO 96/09696 | 3/1996 | WIPO |
| WO 96/35305 | 11/1996 | WIPO |

OTHER PUBLICATIONS

PCT International Search Report, Dec. 18, 1998, PCT/SE 98/00427.
Motorola article, Digital Cellular Traffic Hotspot Detector by Unknown, however at least as early as Mar. 26, 1997, the filing date.

*Primary Examiner*—Reinhard J. Eisenzopf
*Assistant Examiner*—Charles N. Appiah
*Attorney, Agent, or Firm*—Jenkens & Gilchrist, P.C.

[57] ABSTRACT

A method and apparatus for measuring telephone traffic volume in a cellular telephone system which, in a first embodiment, includes a receiver located at a proposed micro-cell site for measuring the traffic volume. In a second embodiment, a test base station transmits a signal and a processor communicates with a base station controller serving macro-cells surrounding the proposed micro-cell site to extract signal strength measurement reports transmitted to the cellular telephone network from mobile stations receiving the signal transmitted by the test base station. In a third embodiment, the test base station is located at the proposed micro-cell site and is assigned a location area identity different from that of the macro-cells surrounding the proposed micro-cell. Mobile stations operating in and around the proposed micro-cell site are required to register in the new location area and transmit a signal strength report which includes the signal strength of the test base station.

25 Claims, 7 Drawing Sheets

METHOD AND APPARATUS FOR PERFORMING LOCAL TRAFFIC MEASUREMENTS IN A CELLULAR TELEPHONE NETWORK

BACKGROUND OF THE INVENTION

1. Technical Field of the Invention

The present invention pertains in general to the selection of cell sites in a cellular telephone network, and more particularly, to a method and apparatus for performing local traffic measurements in a proposed location of a "hot spot" micro-cell.

2. Description of Related Art

As the utilization of a cellular telephone network increases additional capacity must be added to the network to accommodate the increased cellular telephone traffic. One method to increase the capacity of a cellular telephone network is to add additional cells to the network. Two methods are available when adding new cells to an existing cellular telephone network. In both a cellular telephone system having hierarchial capabilities and one that does not, an existing cell-site is subdivided into two or more geographically smaller micro-cells with each micro-cell or micro-cells being assigned a distinct set of radio frequencies for effectuating wireless communication with mobile stations. Mobile stations are then typically served by the cell whose base station transmits the strongest signal as measured by the mobile station.

In a cellular telephone system having hierarchical capabilities new cells may also be added to an existing cellular telephone network using what is referred to as a hierarchical cell structure. In this approach, the current cell is not subdivided into two or more cells, but rather, a new geographically smaller micro-cell is located within the geographical service area of the current serving cell or cells. As in the previous approach, the new micro-cell is assigned a set of radio frequencies for effectuating wireless communication with mobile stations. Unlike the previous approach, however, a mobile station is served by the newly added cell whenever the signal strength of the new cell exceeds a threshold level and not when the signal strength of the new cell is the strongest. Among other concerns, the threshold level typically represents the minimum strength required for reliable communication. This new cell is typically located in a geographical area experiencing a high density of slow moving mobile stations. The micro-cell off-loads cellular telephone traffic from the surrounding macro-cell or macro-cells and thereby increases traffic capacity in the surrounding area.

A problem faced by cellular telephone network providers when adding a new cell, is to identify and verify an appropriate location to create the new cell so as to maximize the number of calls off-loaded to the new cell. To aid in site selection, it is desirable to measure the cellular telephone traffic volume at various proposed cell sites. In a current approach to measuring cellular telephone traffic volume in a Global System for Mobile communications (GSM) cellular telephone network, a dummy base station transmitter called a hot spot beacon is located at the proposed cell site and transmits a dummy broadcast control channel signal. Mobile stations in the surrounding area receive the dummy signal, measure the signal strength, and report the signal strength in their signal strength reports routinely sent to a base station currently servicing the particular mobile station. A processor, located at one of the surrounding base stations, compares the signal strength measurements of the dummy base station and the surrounding base stations to determine the number of mobile stations which measured the signal strength of the dummy base station as stronger than the surrounding base stations. These mobile stations are candidates to be served by the proposed micro-cell and represent the cellular traffic volume which could be off-loaded to a micro-cell in a cellular telephone system without hierarchical capabilities.

Several problems exist with the current methods for measuring cellular telephone traffic volume. First, the current method requires the assignment of a radio frequency for use by the dummy base station. On occasion, a radio frequency may not be available or may require a reassignment of the radio frequencies used by surrounding base stations. Furthermore, the processor which calculates the cellular traffic volume in the current method for measuring cellular telephone traffic volume only intercepts signal strength reports from a single base station. Frequently, there are multiple base stations surrounding the proposed micro-cell site and to obtain the cellular telephone traffic volume, separate measurements must be preformed at each base station.

Therefore, it would be advantageous to devise a method and apparatus for determining cellular telephone traffic volume in a cellular telephone system. Furthermore, it would be advantages to devise a method and apparatus for measuring cellular telephone traffic volume which would not require the assignment of radio frequencies. Still further, it would be advantageous to devices a method and apparatus for measuring from a single location the cellular telephone traffic associated with multiple base stations from a single location.

SUMMARY OF THE INVENTION

The present invention comprises a method and apparatus for measuring cellular telephone traffic volume in a proposed micro-cell site. In a first embodiment of the present invention, a receiver is located at the proposed micro-cell site and measures the signal strength of transmissions from mobile stations transmitting from locations within and around the proposed micro-cell site. A processor communicating with the receiver records the signal strength measurements and their duration and extrapolates the cellular telephone traffic volume based on these measurements.

In a second embodiment of the present invention a test base station, transmitting a broadcast control channel, is located at the proposed micro-cell site. Mobile stations in and around the proposed micro-cell site include a signal strength measurement of the test base station in their routine signal strength reports which are transmitted to the cellular telephone network. A processor in communication with a base station controller extracts the signal strength reports communicated to the base station controller from multiple base stations, and uses the reports to calculate the cellular telephone traffic volume in the proposed micro-cell site. The processor of the present invention can be separate from the base station controller, or alternatively, the base station controller can be programmed to execute the functionality of the processor thereby eliminating the need for the processor.

In a third embodiment of the present invention a test base station is located at the proposed micro-cell site and is assigned a location area different than that of any surrounding macro-cells. It is also possible that there may be no cells surrounding the proposed cell site, in which case, the proposed cell site would provide cellular telephone service to a geographical area not currently served. Idle mobile stations operating in and around the proposed micro-cell site are required to register in the new location area of the test base station. The idle mobile stations transmit a location updating request to the test base station followed by a signal strength report which includes a measured signal strength of the test base station. The test base station delays sending a rejection to the location updating request from the mobile station in order to ensure that at least one signal strength report is transmitted to the test base station by the mobile station. The objective in this embodiment is to measure the number of idle mobile stations in the area of interest. Through the use of previously gathered statistics showing the relationship between the number of idle and active mobile stations, it is possible to estimate the number of active mobiles and thereby the amount of traffic in the area.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Although the present invention is described as being implemented in the Global System for Mobile communication (GSM) standard, it is understood that the invention is capable of implementation in other cellular telephone system protocols.

Figure 1:
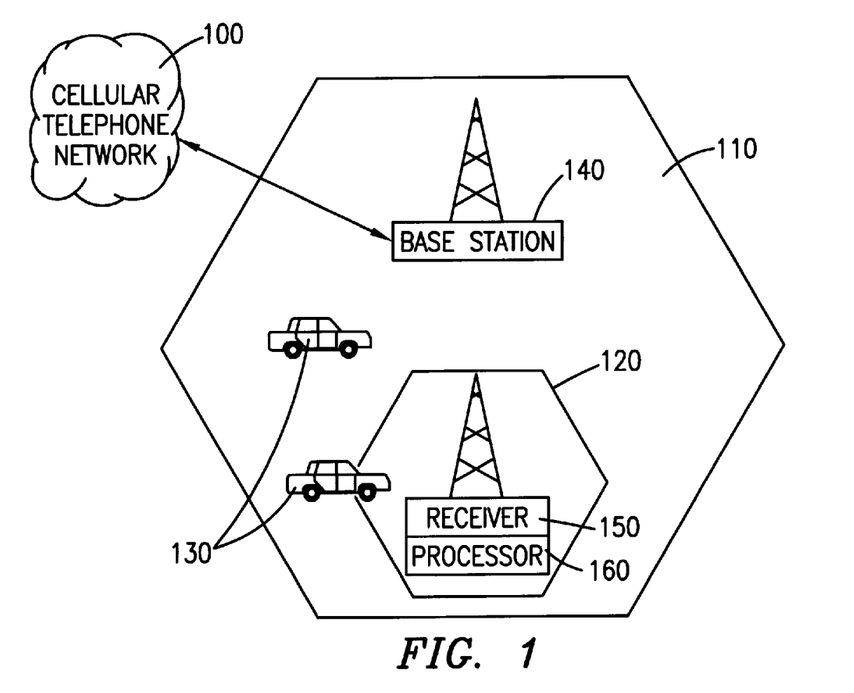
FIG. 1 illustrates a functional block diagram of a first embodiment of the present invention deployed within a single macro-cell utilizing signal strength measurements to measure cellular telephone traffic volume.

Referring now to FIG. 1, there is illustrated a cellular telephone network 100 including a base station 140 providing cellular telephone service to mobile stations 130 operating within a macro-cell 110. To increase cellular telephone capacity within the macro-cell 110, a so called "hot spot" micro-cell 120 can be created. In a cellular telephone system not having hierarchical capabilities, cellular telephone calls are handed-over from a base station 140 serving the macro-cell 110 to a base station (not shown), which will serve the proposed micro-cell 120, based on a comparison between the signal strengths from the macro-cell 110 and the micro-cell 120. Although other factors are considered, a handover typically occurs when the signal strength from the proposed base station (not shown) is stronger than the current macro-cell 110. In a cellular telephone system having hierarchical capabilities, cellular telephone calls are typically handed-over from the base station 140 serving the macro-cell 110 to the base station (not shown), which will serve the proposed micro-cell 120, when the signal strength from the base station (not shown) is above a minimum threshold level. Among other concerns, the threshold level typically represents the minimum signal strength required to provide reliable communication between the proposed base station (not shown) which will serve the micro-cell 120 and the mobile station 130. (The threshold level is also set high enough so as to eliminate co-channel interference caused by the use of the same carrier frequency used in a distant cell.) The micro-cell 120, however, has a relatively limited coverage area as compared to the macro-cell 110, and therefore, the objective is to locate the micro-cell 120 in a location where the greatest amount of traffic can be captured. To determine an optimal location for placement of the micro-cell 120, it is desirable to take cellular telephone traffic volume measurements at various proposed sites.

Although in actual operation both the downlink signal strength of the base station (not shown) of the proposed micro-cell 120 and uplink signal strength of the mobile stations 130 are used in determining when handovers are to occur, a first embodiment of present invention instead uses only the signal strength of the mobile stations 130 to calculate cellular telephone traffic. In the first embodiment of the present invention, a receiver 150 capable of receiving one or more cellular telephone radio frequencies assigned for use by the base station 140 is placed at the proposed micro-cell site 120. The receiver 150 monitors one or more of the radio frequencies and takes signal strength measurements of transmissions from the mobile stations 130. A processor 160 communicating with the receiver 150 records the signal strength measurements and the duration of the measurement. As will be described, the processor 160 processes the recorded data to determine the cellular telephone traffic volume present at the proposed micro-cell site 120.

Figure 2:
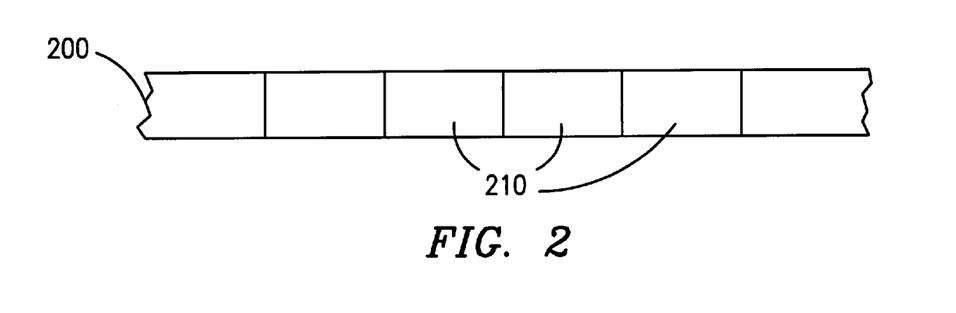
FIG. 2 illustrates a portion of a cellular telephone transmission divided into discrete time slots.

Referring additionally now to FIG. 2 there is illustrated a portion of a cellular telephone transmission 200 divided into discrete time slots 210. Although the receiver 150 may take continuous signal strength measurements of the transmissions 200 from the mobile stations 130, the preferred embodiment incorporates discrete sampling of the cellular telephone transmission 200. The receiver 150 takes signal strength measurements of each time slot 210 and the processor 160 records the measurements and assigns the measurements a duration equal to the duration of the time slot 210. After taking measurements over a period of time, the receiver 150 and processor 160 obtain a statistically sufficient number of samples to allow the processor to extrapolate the cellular telephone traffic volume from the recorded data.

To extrapolate the cellular telephone traffic volume, the processor 160 divides the total number of samples, wherein the measured signal strength is greater than the threshold level, by the total number of samples taken to arrive at a fractional time that the signal strength was above the threshold level. In this and all embodiments, the frequencies which are to be monitored are chosen from frequencies which are not used for signaling purposes. Otherwise, the extrapolation process must first eliminate those time slots which are assigned for signaling purposes and do not represent traffic volume. If the receiver 150 took measurements on only a single radio frequency, the cellular telephone traffic volume is calculated by multiplying the previously calculated fractional time by the total number of radio frequencies assigned to the base station 140. If, on the other hand, the receiver monitored more than one radio frequency, the cellular telephone traffic volume is calculated by first dividing the previously calculated fractional time by the number of radio frequencies monitored and multiplied by the total number of radio frequencies assigned to the base station 140.

For various reasons, including a desire to extend battery life and reduce interference, the cellular telephone network 100 can vary the transmitting output power of the mobile stations 130. In order for the first embodiment of the present invention to make an accurate measurement of cellular telephone traffic volume each mobile station 130 needs to transmit at the same power level. Therefore, the first embodiment of the present invention provides for the cellular telephone network 100 to disable power regulation of mobile stations 130 within the macro-cell site 110.

Figure 3:
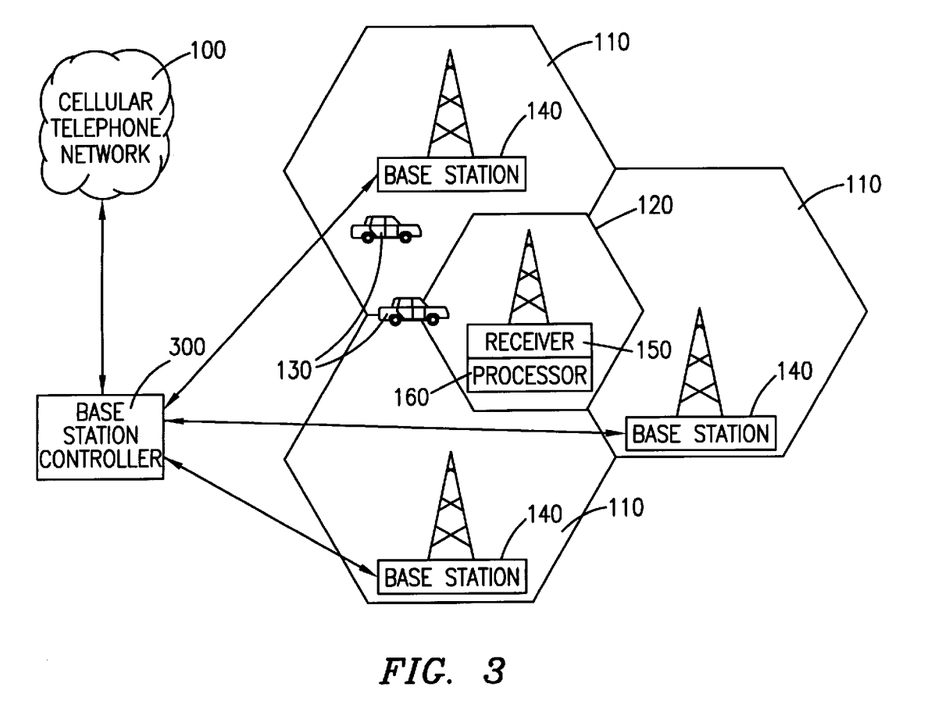
FIG. 3 illustrates a functional block diagram of a first embodiment of the present invention deployed in a location surrounded by a plurality of macro-cells.

Referring additionally now to FIG. 3, there is illustrated the proposed micro-cell site 120 of FIG. 1 surrounded by a plurality of macro-cells 110 currently serving the geographical region of the proposed micro-cell site 120. Each of the macro-cells 110 are served by a corresponding base station 140 which communicate with the cellular telephone network 100 via a common base station controller 300. In a manner consistent with that described in FIG. 1, the receiver 150 monitors one or more radio frequencies assigned to one or more of the base stations 140. As with the description of FIG. 1, power regulation of the mobile stations 130 is disabled. The receiver 150 measures the signal strength of each time slot 210 and the processor 160 records these measurements and their duration. The cellular telephone traffic volume is extrapolated from the data recorded by processor 160. The cellular telephone traffic volume is determined by first calculating the fractional time the measured signal strength was greater than the threshold level. To calculate the fractional time, the processor divides the total number of samples, wherein the measured signal strength of the received signal is greater than the threshold level, by the total number of samples taken. If the receiver 150 took measurements on only a single radio frequency, the cellular telephone traffic volume is calculated by multiplying the previously calculated fractional time by the total number of radio frequencies assigned to the base station 140 using the radio frequency. If, on the other hand, the receiver monitored more than one radio frequency, the cellular telephone traffic volume is calculated by first dividing the previously calculated fractional time by the number of radio frequencies monitored and multiplying by the total number of radio frequencies assigned to the plurality of base stations 140.

Figure 4:
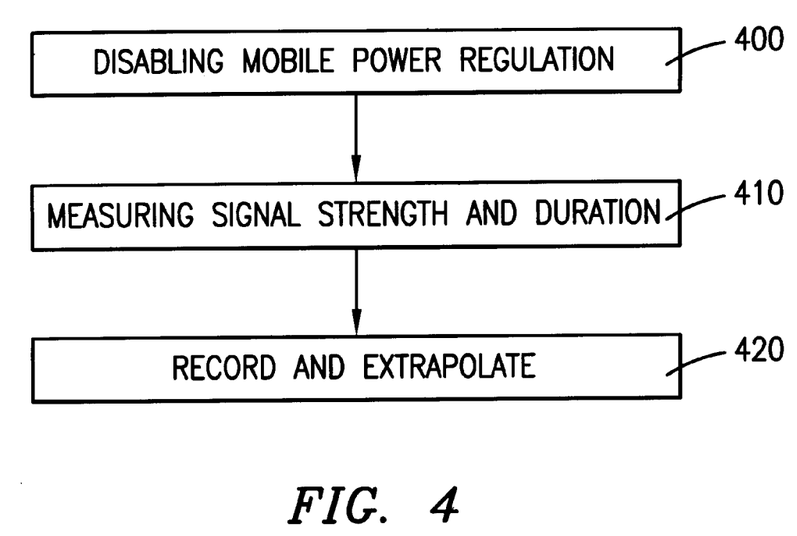
FIG. 4 illustrates a flow diagram for a first embodiment of the present invention.

Referring additionally now to FIG. 4, there is illustrated a flow diagram of the first embodiment of the present invention. Prior to taking signal strength measurements, the power regulation of mobile stations 130 is disabled (step 400). In this step, the cellular telephone network 100 directs the base station 140 to disable power regulation. Once power regulation has been disabled, the receiver 150 measures signal strength and duration (step 410), of transmissions 200 from the mobile stations 130. As the receiver 150 takes the signal strength measurements, the processor 160 records the data and extrapolates cellular telephone traffic volume (step 420).

Figure 5:
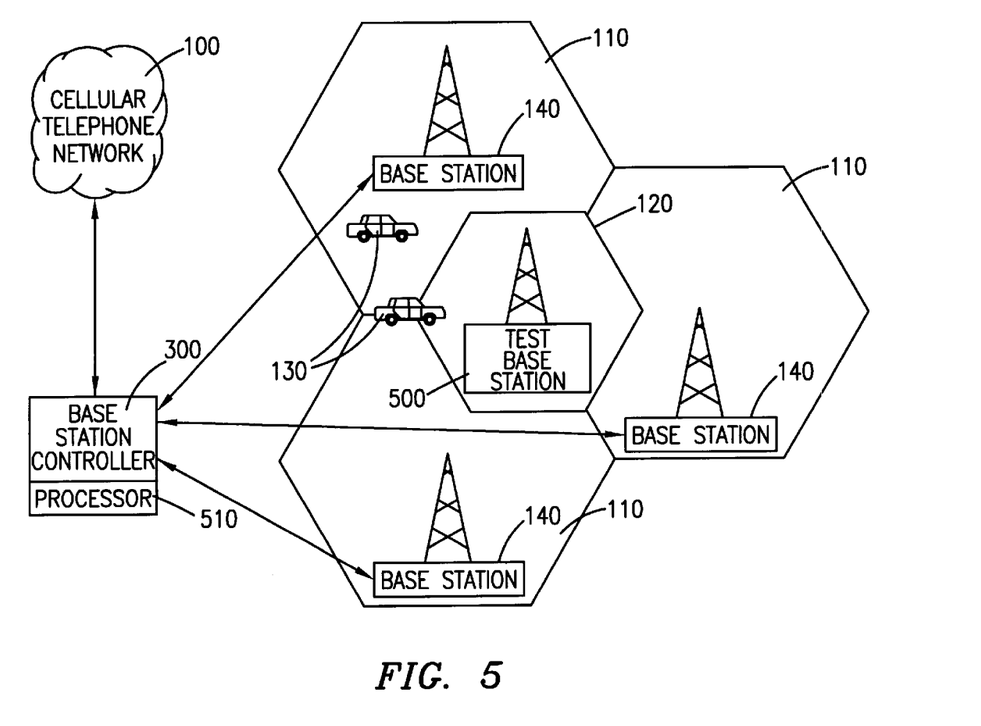
FIG. 5 illustrates a functional block diagram of a second embodiment of the present invention where mobile station signal strength measurements are collected from multiple macro cells.

Referring additionally now to FIG. 5, there is illustrated a second embodiment of the present invention. A cellular telephone network 100 includes a plurality of base stations 140 which provide cellular telephone service in the corresponding macro-cells 110. Each of the base stations 140 are connected to the cellular telephone network 100 via a common base station controller 300. In the second embodiment of the present invention, a test base station 500 is located at the proposed micro-cell site 120. The test base station 500 is limited in its functionality but at a minimum, includes a transmitter for transmitting a broadcast control channel. The antenna and transmitter output power of the test base station 500 are chosen to achieve the same coverage as the proposed micro-cell 120. The test base station 500 is intended only to transmit a broadcast control frequency and not to facilitate communications between mobile stations 130 and the cellular telephone network 100, and therefore, communication between the test base station 500 and the cellular telephone network 100 is unnecessary.

As a mobile station travels throughout the geographical service area of a cellular telephone network, it is provided with a broadcast control frequency allocation list containing a list of radio frequencies representing cell sites whose broadcast control channels the mobile station is required to monitor. These cells are cells surrounding the mobile station at its current location which could potentially be candidates for serving the mobile station. The mobile station is required to measure the signal strength of each base station transmitter represented by the frequencies included in the list and report the six strongest signal strength measurements to the base station currently serving the mobile station. The signal strength reports are further communicated to the base station controller connecting the serving base station to the cellular telephone network and are used to determine when to handover the mobile station from the base station currently serving the mobile station to another base station.

In the second embodiment of the present invention, a test base station 500 is established within the cellular telephone network 100. Although the test base station 500 is not in communication with the cellular telephone network 100, the test base station 500 is assigned a radio frequency to transmit a broadcast control channel. The cellular telephone network 100 includes the broadcast control channel, assigned to the test base station 500 in broadcast control channel allocation lists which are provided to mobile stations 130 served by the plurality of macro-cells 110 surrounding the proposed micro-cell 120. Since the broadcast control channel of the test base station 500 is included in the broadcast control channel allocation lists given to mobile stations 130 served by the plurality of macro-cells 110, the mobile stations 130 are required to take a signal strength measurement of the test base station 500 and include the measurement in the signal strength report sent to the cellular telephone network assuming that the test base station 500 is among the six strongest signals. Every 0.48 seconds, signal strength measurement reports are communicated to the base station controller 300 via the base station 140 currently serving the mobile station 130. To prevent the mobile stations 130 from attempting to access the test base station 500, a cell barred flag associated with the test base station 500 is set. By setting the cell barr access indicator, mobile stations are prevented from camping on the cell, thereby, disabling access to the test base station 500. Alternatively, vital information necessary for idle mode stations to camp on a base station can be left out of the test base station 500 broadcasts, thereby, making the test base station 500 unsuitable to camp on. Using either approach, therefore, mobile stations 130 surrounding the test base station 500 are required to report the signal strength of the test base station 500 in their ordinary signal strength measurement reports, but are prevented from accessing the test base station 500.

Several methods exist for identifying the test base station signal strength contained in the signal strength measurement reports set to the base station controller 300. For example, the base station identity code of the test base station 500 can be used. In the preferred embodiment, however, the test base station 500 is excluded from the neighbor cell list and thus is identified as an unidentified neighbor. In the second embodiment of the present invention, a processor 510 communicates with the base station controller 300 and extracts all signal strength reports containing an undefined neighbor. As stated earlier, the processor 510 can be eliminated and the base station controller 300 can perform the functionality otherwise performed by the processor 510. The processor 150 records the signal strength of the test base station 500, identified as an unidentified neighbor, and the signal strength of the surrounding base stations 140. After extracting and recording signal strength reports over a period of time, the processor 510 obtains a statistically sufficient number of data to allow the processor 510 to calculate the cellular traffic volume at the proposed micro-cell site 120.

There are two methods for calculating the cellular telephone traffic volume based on the data collected depending on whether the cellular telephone system employs hierarchial cells. In a cellular telephone system not employing hierarchial cells, a decision to handover a mobile station 130 to the base station (not shown) of the proposed micro-cell site 120 is based on a comparison of the signal strength offered by the cells. Also, since mobile stations 130 are required to transmit a signal strength report every 0.48 seconds, each signal strength report represents signal strength over a 0.48 second period. Therefore, to calculate the cellular telephone traffic volume in a cellular telephone system not employing hierarchial cells, the processor 510 multiplies the total number of signal strength reports, wherein the signal strength of the test base station 500 exceeds the signal strength of the plurality of base stations 140, by 0.48 seconds and divides the product by the period of time over which the measurements were taken. To calculate the cellular telephone traffic volume in cellular telephone system containing hierarchial cells, the processor 510 multiplies the total number of signal strength reports, wherein the signal strength of the test base station 500 exceeds the threshold level, by 0.48 seconds and divides the product by the period of time over which the measurements were taken.

Figure 6:
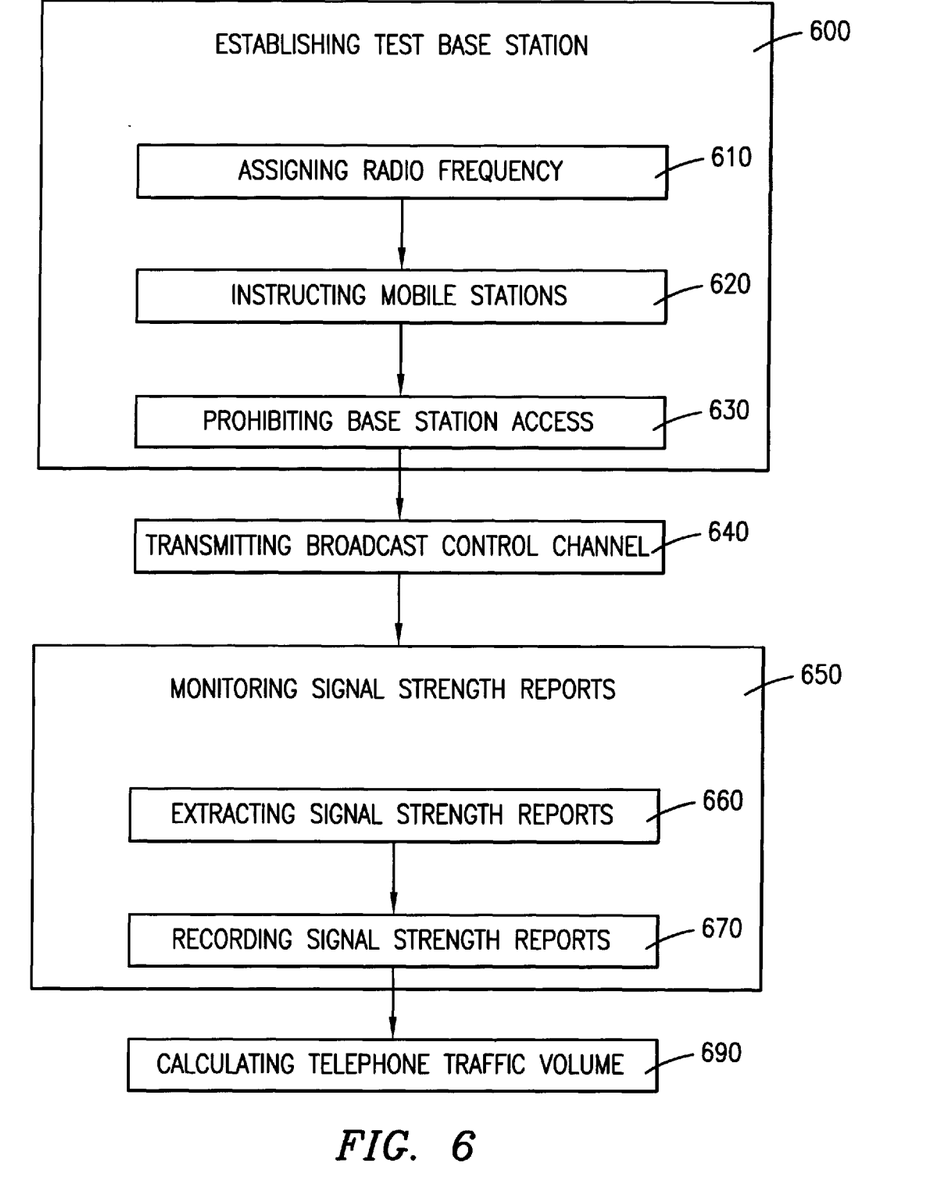
FIG. 6 illustrates a flow diagram of a second embodiment of the present invention.

Referring additionally now to FIG. 6, there is illustrated a flow diagram for the second embodiment of the invention. The test base station 500 is established (step 600) within the cellular telephone network 100. This step further includes the steps of assigning a radio frequency (step 610), instructing mobile stations 130 to include the test base station 500 in signal strength reports (step 620), and prohibiting access to the test base station (step 630) by the mobile stations 130. The radio frequency assigned to the test base station 500 in step 610 is used by the test base station 500 to transmit a broadcast control channel. In step 620, the mobile stations 130 are required to include measurements of the test base station 500 in signal strength reports by including the broadcast control channel of the test base station 500 in the broadcast control channel allocation list provided to mobile stations 130 serviced by the plurality of macro-cells 110. In step 630, the mobile stations 130 are prohibited from accessing the test base station 500 by setting a cell barred flag or by omitting critical information in the test base station 500 broadcast control cannel.

After the test base station 500 is established in the cellular telephone network 100 the test base station 500 transmits a broadcast control channel (step 640). The processor 510 monitors signal strength reports (step 650) transmitted by the mobile stations 130 to their respective serving base stations 140 which communicate the signal strength report to a base station controller 300. The monitoring of signal strength reports step 650 includes the steps of extracting signal strength reports (step 660) from the cellular telephone network 100 and recording signal strength reports (step 670). In step 660 signal strength reports containing a signal strength measurement of the test base station 500 are identified by omitting the test base station 500 from the neighbor cell list thereby causing the signal strength report to include a signal strength measurement for an unidentified neighbor. The processor 510 extracts all signal strength measurement reports transmitted to the base station controller 300 containing a record of an unidentified neighbor. Since the plurality of macro-cells 110 communicate signal strength reports to a common base station controller 300 the processor 510 can extract signal strength reports from all macro-cells 110 surrounding the proposed micro-cell site 120. After extracting signal strength reports steps 660 from the base station controller 300, the processor 510 records the signal strength measurements included in the report for all the base stations 140 surrounding the proposed micro-cell site 120 and the signal strength of the test base station 500. After extracting and recording signal strength reports over a period of time yielding a statistically significant number of data, the processor 510 calculates the cellular telephone traffic volume (step 690). In a cellular telephone system not employing hierarchical cells, the processor 510 multiplies the total number of signal strength reports, wherein the signal strength of the test base station 500 exceeds the signal strength of all base stations 140, by 0.48 seconds and divides the product by the period of time over which measurements were taken to obtain the cellular telephone traffic volume. In a hierarchical cellular telephone system the processor 510 multiplies the total number of signal strength reports, wherein the signal strength of the test base station 500 exceeds the threshold level, by 0.48 seconds and divides the product by the period of time over which the measurements were taken to obtain the cellular telephone traffic volume.

Figure 7:
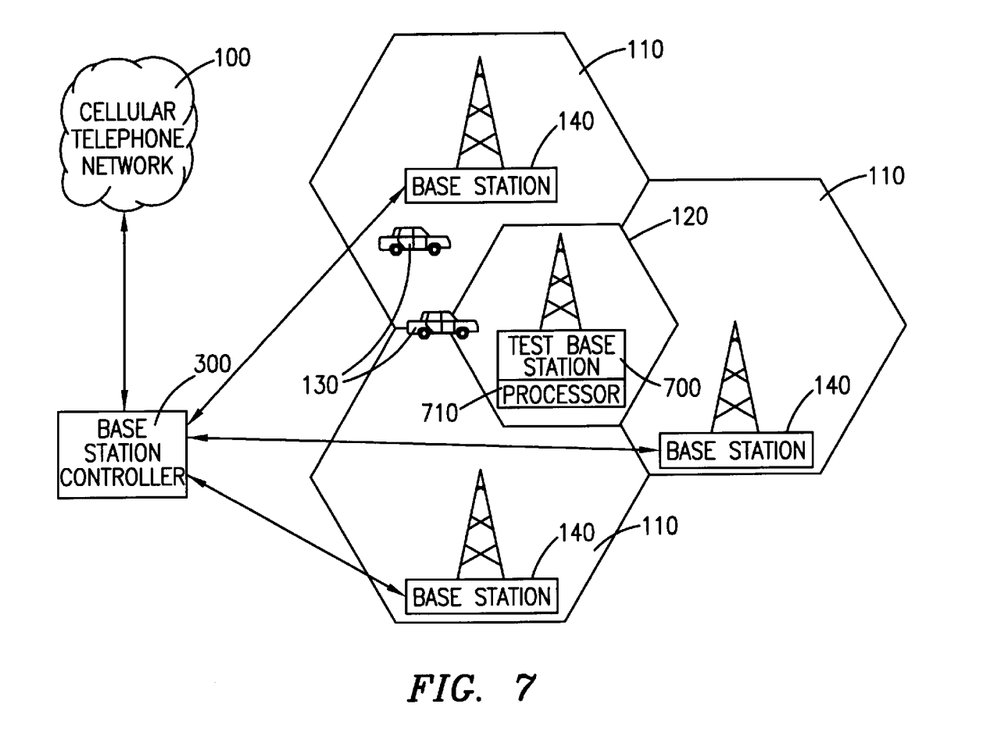
FIG. 7 illustrates a functional block diagram of a third embodiment of the present invention wherein mobile stations are forced to register in a new location area.

Referring additionally now to FIG. 7 there is illustrated a third embodiment of the present invention. As with the second embodiment of the present invention a test base station 700 transmits a broadcast control frequency channel on frequency assigned to the test base station 700. Unlike the second embodiment of the present invention, however, the proposed micro-cell 120 is set up as a new location area through the use of a location area identity different from that of the surrounding macro-cells 110. Mobile stations 120 operating in an idle mode near the proposed micro-cell 120 are required to register with the test base station 700 due to a location area change. To register, idle mobile stations 130 make a location updating request to the test base station 700 and transmit a signal strength report which includes the measured signal strength of the test base station 700. The test base station 700 delays responding to the updating request until the mobile station 130 transmits a signal strength measurement report. The test base station 700 responds with a rejection to the updating request by the mobile stations 130 thereby causing the mobile stations 130 to select another base station to camp on. The rejection insures that no mobile station 130 is cut off from the cellular telephone system 100 due to an attempt to camp on the test base station 700. A processor 710, communicating with the test base station 700, records the signal strength reports transmitted to the test base station 700 and calculates the cellular telephone traffic volume in the proposed micro-cell 120.

To calculate the cellular telephone traffic volume within the proposed micro-cell 120 the processor 710 compares the signal strength of the test base station 700 against the surrounding macro-cells 110 in a cellular telephone system not employing hierarchical cells or against the threshold level in a cellular telephone system employing hierarchical cells respectively to determine determine the number of mobile stations 130 which would have been allowed to camp on the test base station 700. As with the previous embodiment, the test base station 700 would serve the mobile station when the test base station 700 had a stronger signal respectively. To calculate the cellular telephone traffic volume using this embodiment it is necessary that statistical data measuring the ratio of active mobile stations to idle mobile stations be known. Using this data and the data gathered showing the number of idle mobile stations which would have been allowed to camp on the test base station 700, the processor 710 extrapolates the number of active mobile stations which represent the cellular telephone traffic volume in the proposed micro cell site 120.

Figure 8:
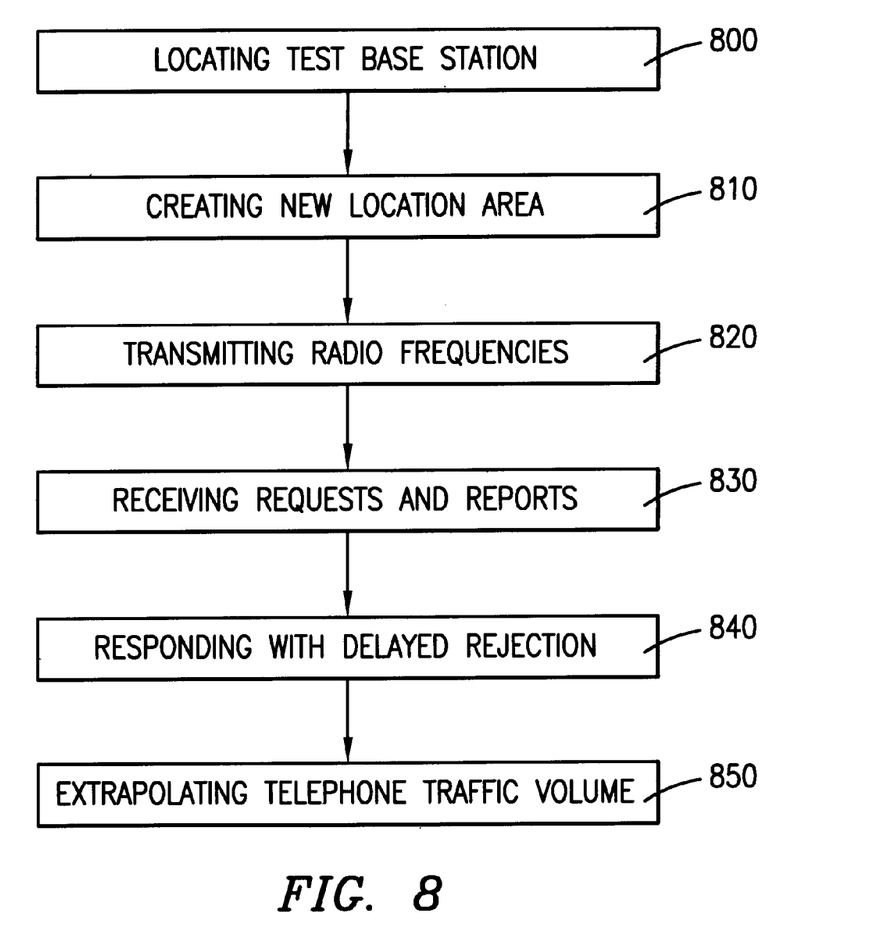
FIG. 8 illustrates a flow diagram for a third embodiment of the present invention.

Referring additionally to FIG. 8, there is illustrated a flow diagram for the third embodiment of the present invention. A test base station 700, including a transmitter and a receiver, are located at the proposed micro-cell site 120 (step 800). The test base station 700 is assigned a new location area (step 810) which is different from the location area assigned to the plurality of macro-cells 110 surrounding the proposed micro-cell 120. The test base station 700 transmits a broadcast control channel on radio frequencies assigned to the test base station 700 (step 820). Idle mobile stations 130 traveling near the proposed micro-cell site 120 are required to register with the test base station 700 assigned the new location area. The mobile stations 130 also transmit a signal strength report to the test base station 700 which is received by the test base station 700 (step 830). The test base station 700 transmits a delayed rejection response (step 840) to the mobile stations 130 thereby prohibiting the mobile stations 130 from camping on the test base station 700. A processor 710, communicating with the test base station 700, records the signal strength measurements and extrapolates the cellular telephone traffic volume (step 850). The processor 710 calculates the number of idle mobile stations which would camp on the test base station 700 if allowed by comparing the signal strength of the test base station 700 against the signal strength of the surrounding macro-cells 110 in a cellular telephone system not employing hierarchical cells or against the threshold level in a cellular telephone system employing hierarchical cells. To calculate the cellular telephone traffic volume using this embodiment it is necessary that statistical data measuring the ratio of active mobile stations to idle mobile stations be known. Using this data and the data gathered showing the number of idle mobile stations which would have camped on the test base station 700 if allowed, the processor 710 extrapolates number of active mobile stations which represent the cellular telephone traffic volume in the proposed micro-cell site 120.

The third embodiment of the present invention, if deployed in a cellular telephone system using the Global System for Mobile communications, works only in an area having a majority of phase 2 mobile stations as compared to phase 1 mobile stations. Unlike phase 2 mobile stations which look for an alternative cell (location area) to camp on when rejected from one location area, phase 1 mobile stations instead enter a limited service state. While in this state, the mobile station is unable to make a telephone call and remains in this state until it leaves the transmitter area and enters a new location area.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for measuring cellular telephone traffic volume in a proposed cell site of a cellular telephone network comprising the steps of:

disabling mobile station power regulation within the proposed cell site;

measuring signal strength and duration of mobile station transmissions on at least one radio frequency used by a base station currently servicing the proposed cell site; and extrapolating the cellular telephone traffic volume based on the signal strengths, the signal durations, and total number of radio frequencies used by the base station currently servicing the proposed cell site.

2. The method recited in claim 1, wherein the step of measuring signal strength and duration comprises sampling the signal strength of each time slot transmitted by mobile stations within the proposed cell site.

3. The method recited in claim 2, wherein the step of extrapolating the cellular telephone traffic volume comprises the steps of:

dividing the number of sampled time slots, wherein the signal strength exceeds a desired threshold level, by the product of total number of time slots sampled and the total number of radio frequencies measured to calculate a fractional time that the sampled signal exceeded the desired threshold level; and multiplying the fractional time by the total number of radio frequencies used by the base station currently servicing the proposed cell site location.

4. A method for measuring cellular telephone traffic volume in a proposed cell site of a cellular telephone network comprising the steps of:

disabling mobile station power regulation within the proposed cell site;

measuring signal strength and duration of mobile station transmissions on at least one radio frequency for each of a plurality of base stations currently servicing the proposed cell site; and extrapolating the cellular telephone traffic volume based on the signal strengths, the signal durations, and total number of radio frequencies collectively used by the plurality of base stations currently servicing the proposed cell site.

5. The method recited in claim 4, wherein the step of measuring signal strength and duration comprises sampling the signal strength of each time slot transmitted by mobile stations within the proposed cell site.

6. The method recited in claim 4, wherein the step of extrapolating the cellular telephone traffic volume comprises the steps of:

dividing the number of sampled time slots, wherein the signal strength exceeds a desired threshold level, by the product of the total number of time slots measured and the total number of radio frequencies sampled to calculate a fractional time that the sampled signal exceeds the desired threshold level; and multiplying the fractional time by the total number of radio frequencies collectively used by the base stations currently servicing the proposed cell site.

7. A method for measuring cellular telephone traffic volume in a proposed cell site of a hierarchical cellular telephone network comprising the steps of:

establishing a test base station within the cellular telephone network;

transmitting at least one assigned radio frequency from the test base station located at the proposed cell site;

monitoring, over a period of time, the number of signal strength reports transmitted by mobile stations to the cellular telephone network containing a signal strength measurement of the test base station; and calculating the cellular telephone traffic volume based on the total number of signal strength reports containing a signal strength measurement of the test base station wherein the strength exceeds a desired threshold level, the monitored period of time, and a period of time representing each signal strength report.

8. The method recited in claim 7, wherein the step of establishing a test base station further includes the steps of:

assigning at least one radio frequency for use by the test base station;

instructing mobile stations to include the test base station in signal strength reports; and prohibiting mobile stations from attempting to access the test base station.

9. The method recited in claim 7, wherein the step of establishing a test base station further includes the steps of:

assigning at least one radio frequency for transmission by the test base station;

including the test base station in broadcast control channel allocation lists of cell sites surrounding the proposed cell site thereby requiring mobile stations to include measured signal strengths of the test base station in signal strength reports; and setting a cell-bar flag to prohibit mobile stations from attempting to access the test base station.

10. The method recited in claim 7, wherein the step of transmitting the at least one assigned radio frequency comprises transmitting a broadcast control channel.

11. The method recited in claim 10, wherein the step of extracting signal strength reports from the cellular telephone network includes extracting the signal strength reports from at least one base station controller in communication with at least one base station currently servicing the proposed cell site.

12. The method recited in claim 7, wherein the step of monitoring the number of signal strength reports transmitted by mobile stations includes the steps of:

omitting the test base station from neighbor cell lists to identify signal strength reports as containing an unidentified neighbor;

extracting, from the cellular telephone network, all signal strength reports identified as an unidentified neighbor; and recording the number of signal strength reports containing a signal strength measurement for the unidentified neighbor in which the strength exceeds a threshold level.

13. The method recited in claim 7, wherein the step of calculating the cellular telephone traffic volume includes the steps of:

multiplying the total number of signal strength reports containing a signal strength measurement of the test base station, wherein the signal strength of the test base station exceeds a desired threshold level, by the period of time representing each signal strength report to obtain a duration of time when the test base station signal strength exceeds the threshold level; and dividing the duration of time by the monitored period of time.

14. An apparatus for measuring cellular telephone traffic volume in a proposed cell site of a hierarchical cellular telephone network comprising:

a radio transmitter located at the proposed cell site for transmitting a broadcast control channel;

at least one base station for receiving signal strength reports containing signal strength measurements of the radio transmitter from mobile stations; and a processor for monitoring the signal strength reports received by the base station, and further, for calculating the cellular telephone traffic volume based on the signal strength reports, signal durations and total number of radio frequencies used by the radio transmitter.

15. A method for measuring cellular telephone traffic volume in a proposed cell site of a cellular telephone network comprising the steps of:

establishing a test base station within the cellular telephone network;

transmitting at least one assigned radio frequency from the test base station located at the proposed cell site;

monitoring, over a period of time, the number of signal strength reports transmitted by mobile stations to the cellular telephone network containing a signal strength measurement of the test base station;

extracting the signal strength reports from at least one base station-controller in communication with at least on base station currently servicing the proposed cell site; and calculating the cellular telephone traffic volume based on the total number of signal strength reports wherein the signal strength measurement of the test base station exceeds the signal strength measurement of a base station currently serving the mobile station, the monitored period of time, and a period of time representing each signal strength report.

16. The method recited in claim 15, wherein the step of establishing a test base station further includes the steps of:

assigning a radio frequency for use by the test base station;

instructing mobile stations to include the test base station in signal strength reports; and prohibiting mobile stations from attempting to access the test base station.

17. The method recited in claim 15, wherein the step of establishing a test base station further includes the steps of:

assigning a radio frequency for transmission by the test base station;

including the test base station in broadcast control channel allocation lists of cell sites surrounding the proposed cell site thereby requiring mobile stations to include measured signal strengths of the test base station in signal strength reports; and setting a cell-bar flag to prohibit mobile stations from attempting to access the test base station.

18. The method recited in claim 15, wherein the step of transmitting the at least one assigned radio frequency comprises transmitting a broadcast control channel.

19. The method recited in claim 15, wherein the step of monitoring the number of signal strength reports transmitted by mobile stations includes the steps of:

omitting the test base station from neighbor cell lists to identify signal strength reports as containing an unidentified neighbor;

extracting, from the cellular telephone network, all signal strength reports identified as containing an unidentified neighbor; and recording the number of signal strength reports containing a signal strength measurement for the unidentified neighbor in which the strength of the test base station exceeds the signal strength of a base station currently serving the mobile station.

20. The method recited in claim 15, wherein the step of calculating the cellular telephone traffic volume includes the steps of:

multiplying the total number of signal strength reports, wherein the signal strength of the test base station exceeds the signal strength of the base station currently serving the mobile station, by the period of time representing each signal strength report to obtain a duration of time when the test base station signal strength exceeds the signal strength of the base station currently serving the mobile station; and dividing the duration of time by the monitored period of time.

21. A method for measuring cellular telephone traffic volume in a proposed cell site of a cellular telephone network comprising the steps of:

locating a test base station within the cellular telephone network;

assigning the proposed cell site a new location area identity different from cell sites surrounding the proposed cell site thereby forcing idle mobile stations to register with the test base station;

transmitting a broadcast control channel from the test base station;

receiving location updating requests and a signal strength measurement reports transmitted by idle mobile stations;

responding with a rejection to the location updating request, the response being delayed until a signal strength measurement report has been received by the test base station; and multiplying the number of signal strength reports transmitted to the test base station, wherein the strength of the test base station exceeds a desired threshold level, by a statistical ratio of the number of active to idle mobile stations to determine the cellular telephone traffic volume.

22. The method recited in claim 21, wherein the base station is disconnected from the cellular telephone network.

23. A method for measuring cellular telephone traffic volume in a proposed cell site of a cellular telephone network comprising the steps of:

locating a test base station within the cellular telephone network;

assigning the proposed cell site a new location area identity different from cell sites surrounding the proposed cell site thereby forcing idle mobile stations to register with the test base station;

transmitting a broadcast control channel from the test base station;

receiving location updating requests and a signal strength measurement reports transmitted by idle mobile stations;

responding with a rejection to the location updating request, the response being delayed until a signal strength measurement report has been received by the test base station; and multiplying the number of signal strength reports transmitted to the test base station, wherein the signal strength of the test base station exceeds signal strengths of base stations surrounding the proposed cell site, by a statistical ratio of the number of active to idle mobile stations to determine the cellular telephone traffic volume.

24. The method recited in claim 23, wherein the base station is disconnected from the cellular telephone network.

25. Apparatus for measuring cellular telephone traffic volume in a proposed cell site of a cellular telephone network comprising:

a test base station assigned a distinct location area identity and located at the proposed cell site, the test base station for broadcasting a control channel and receiving both location updating requests and signal strength reports containing signal strength measurements of the test base station from mobile stations, the base station further for transmitting a rejection denying service by the test base station to the mobile station in response to receipt of the location updating request and the signal strength report, and a processor communicating with the test base station, the processor for recording signal strength reports received by the test base station and further for calculating cellular telephone traffic volume based on the signal strength reports, signal durations and total number of radio frequencies used by the test base station.

* * * * *